US012315341B2

(12) United States Patent
Stevendahl et al.

(10) Patent No.: US 12,315,341 B2
(45) Date of Patent: May 27, 2025

(54) SYSTEMS AND METHODS FOR CASINO GAMES

(71) Applicant: RAW IGAMING LTD., Pieta (MT)

(72) Inventors: Alexander Stevendahl, Pieta (MT); Thomas Wood, Kalmar (SE)

(73) Assignee: RAW IGAMING LTD., Pieta (MT)

( * ) Notice: Subject to any disclaimer, the term of this patent is extended or adjusted under 35 U.S.C. 154(b) by 238 days.

(21) Appl. No.: 17/960,035

(22) Filed: Oct. 4, 2022

(65) Prior Publication Data

US 2023/0103751 A1 Apr. 6, 2023

Related U.S. Application Data

(60) Provisional application No. 63/251,813, filed on Oct. 4, 2021.

(51) Int. Cl.
*G07F 17/32* (2006.01)

(52) U.S. Cl.
CPC ...... *G07F 17/3258* (2013.01); *G07F 17/3218* (2013.01); *G07F 17/323* (2013.01); *G07F 17/3267* (2013.01)

(58) Field of Classification Search
None
See application file for complete search history.

(56) References Cited

U.S. PATENT DOCUMENTS

2005/0070353 A1* 3/2005 Webb ...................... G07F 17/34 463/16
2012/0238343 A1* 9/2012 Perrone ............... G07F 17/3262 273/274
2014/0335933 A1* 11/2014 Robbins .............. G07F 17/3267 463/20
2015/0141118 A1* 5/2015 Lefebvre ............. G07F 17/3255 463/22
2016/0217657 A1* 7/2016 Halter ................. G07F 17/3258

* cited by examiner

*Primary Examiner* — Jason T Yen
(74) *Attorney, Agent, or Firm* — ONE LLP

(57) ABSTRACT

Disclosed are example embodiments of systems and methods for gaming. An example gaming system includes at least one processor and a memory coupled to the at least one processor. The at least one processor is configured to track a first received bet and present a representation of a first wheel-based game of chance having a first number of possible outcomes. The at least one processor is configured to track a second received bet and present a representation of a second wheel-based game of chance having a second number of possible outcomes. Presenting at least one of the representations of the first wheel-based game or the representation of the second wheel-based game occurs after receiving at least one of the first received bet and the second received bet, respectively.

13 Claims, 8 Drawing Sheets

FIG. 4
LANDSCAPE VIEW
MAG SPIN
MAG SPIN
BALANCE
TOTAL WIN
TOTAL BET

FIG. 6
Chaos Spins
Free Spins
Featuring
Game Data
15,000x
95.5%, 94.5%, 90.5%
0.10
TBD
Egyptian Gods
Increasing Multipliers
Multiplier Collection Bonus
Bonus Rush™

SYSTEMS AND METHODS FOR CASINO GAMES

CLAIM OF PRIORITY UNDER 35 U.S.C. § 119

The present application for patent claims priority to U.S. Provisional Patent Application No. 63/251,813 entitled "SYSTEMS AND METHODS FOR CASINO GAMES", filed Oct. 4, 2021, and assigned to the assignee hereof and hereby expressly incorporated by reference herein.

TECHNICAL FIELD

The disclosure relates generally to the field of entertainment, specifically and not by way of limitation; some embodiments are related to casino games.

BACKGROUND

In online casino gaming today, between 200-250 new online Casino games are released each month. Approximately 7-9 games per day go live, which neither operator nor players can consume. Approximately 85-90% of these look the same and have the same features. Many games are all generally the same. This "sameness" may be referred to as the "Sea of Sameness" because so many games look the same and have the same features.

The games looking the same underline the commoditization of these games. Online gaming lobbies have started to look like grocery store shelves where positioning and rebates/offers drive public consumption. With increasing regulation, rebates and offers are becoming a thing of the past; it is believed that innovation and differentiation will drive operator and public consumption soon.

SUMMARY

Disclosed are example embodiments of systems and methods for gaming. In an aspect, a gaming system includes at least one processor and a memory coupled to the at least one processor, the at least one processor configured to track a first received bet, present a representation of a first wheel-based game of chance having a first number of possible outcomes, track a second received bet, and present a representation of a second wheel-based game of chance having a second number of possible outcomes, wherein presenting at least one of the representation of the first wheel-based game or the representation of the second wheel-based game occurs after receiving at least one of the first received bet and the second received bet, respectively.

In an aspect, a method of a gaming system includes tracking a first received bet, presenting a representation of a first wheel-based game of chance having a first number of possible outcomes, tracking a second received bet, and presenting a representation of a second wheel-based game of chance having a second number of possible outcomes, wherein presenting at least one of the representation of the first wheel-based game or the representation of the second wheel-based game occurs after receiving at least one of the first received bet and the second received bet, respectively.

In an aspect, a computer-readable medium storing instructions is configured to direct a computing device to perform a method. The method including tracking a first received bet, presenting a representation of a first wheel-based game of chance having a first number of possible outcomes, tracking a second received bet, and presenting a representation of a second wheel-based game of chance having a second number of possible outcomes, wherein presenting at least one of the representation of the first wheel-based game or the representation of the second wheel-based game occurs after receiving at least one of the first received bet and the second received bet, respectively.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

Figure 1:
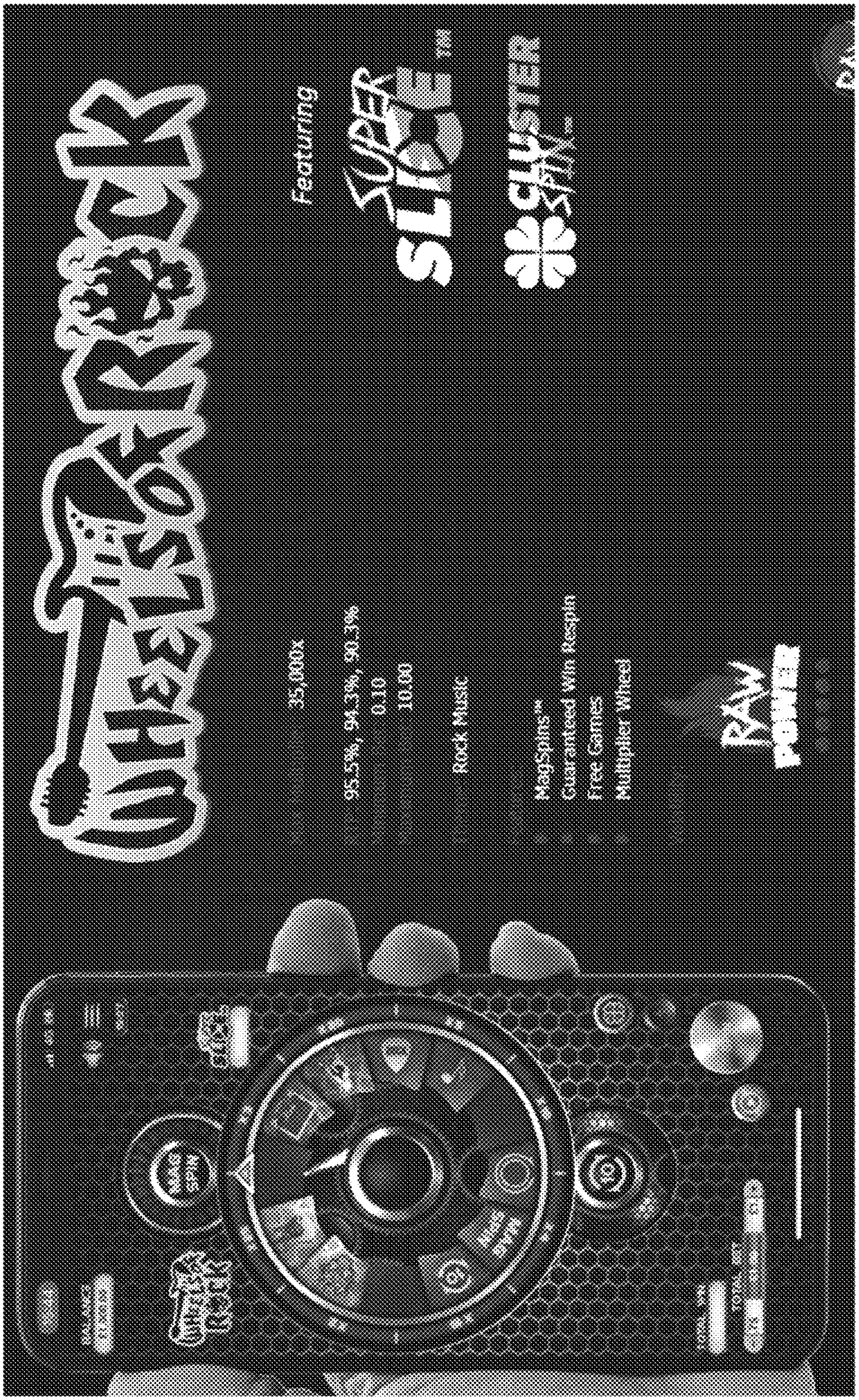
FIG. 1 is a diagram illustrating an example screen in accordance with the systems and methods described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

DETAILED DESCRIPTION

The detailed description set forth below in connection with the appended drawings is intended as a description of configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form to avoid obscuring such concepts.

Several aspects of gaming systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends on the application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field-programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that a computer can access. By way of example, and not limitation, such computer-readable media can comprise random-access memory (RAM), a read-only memory (ROM), an electrically erasable programmable ROM (EEPROM), optical disk storage, magnetic disk storage, other magnetic storage devices, combinations of the types mentioned above of computer-readable media, or any other medium that can be used to store computer-executable code in the form of instructions or data structures that a computer can access.

The systems and methods described herein may relate to games. Some of these systems and methods may relate to games of chance. Some of these games of chance may include betting. For example, some games may relate to slot machines. Some embodiments may address one or more of the following three issues, (1) innovating outside of the current slot game commoditization, which includes many very similar games and may be referred to as the "Sea of Sameness," (2) simplifying the player experience, and/or (3) the similar game design and presentation to games of chance.

To simplify the player experience, the 10-15% that are not like the other 85%-90% of games may be developed by studios who try to innovate. These studios still take a standard approach to developing the games. These studios may attempt to create more differentiation by adding more symbols, bigger-sized games, more winning lines, and combinations, creating more complex games that players may find hard to follow and understand, especially when the player may be new to iGaming. When experiencing these new games on smaller mobile interfaces, it becomes harder to see or follow the gaming experience. Players may also become confused as to why they won or lost.

Some games offer up to 1-2 million winning lines that are impossible to visually represent and difficult to follow. Some games may grow from 3×5 (columns & rows) to 10×16 (columns & rows), creating a vast array of symbols, win lines, and animations. While the presentation may be exciting, the presentation may also complicate the view for players and make it hard to understand and follow what is causing the win or loss of the game.

The systems and methods described herein may create an exciting new experience for players but may minimize the number of symbols in some example embodiments. The systems and methods described herein may also simplify the experience so players may quickly and easily follow the gameplay and understand game payouts.

As discussed above, many current games may have similar game designs and presentations. Many, if not most games that go live online or even land-based, may utilize the same presentation and base mechanics. While utilizing the same presentation and base mechanics may create comfort and recognition for players, the commoditization of slots has made it difficult to decern one game or supplier from another. Utilizing the same presentation and base mechanics may also limit the level of innovation, the presentation of those games, or both limited the level of innovation and the presentation of those games. Innovation may be desired. However, few slot games show a new experience to players.

Studios may call minor adjustments in math features or game art enhancements innovations. Contrary to the assertion that minor adjustments in math features or game art enhancements are innovations, however, the experience for the player is still the same as before. Very few game design studios have created innovations that break outside traditional slot mechanics' regular templates. Studios may, in some cases, openly copy their competitor's game styles and mechanics. The studios that copy their competitors may believe that the same design should work if a game design works for their competitor. Copying game designs may leave operators, e.g., casinos, online casinos, or other operators, with less differentiation in the operator's offering and may leave players with very similar gaming experiences.

Differentiation and innovation may seldom be seen. In some cases, a studio may either not have the creativity to come up with something new, or the studio may not be willing to take the risk to innovate. In some cases, a studio may not see the value in innovation, or the studio may not have the financial backing to allow for innovation. Some example embodiments may aim to solve these issues by presenting operators and players with unique new math mechanics and game art presentations that may offer new and exciting experiences different from current gaming systems and gaming devices. Such embodiments may cut through "the Sea of Sameness." New games might not use the same overused gimmicks and, accordingly, may give operators something new to market and differentiate them from others. Each math engine or game product may create a new way of playing casino games. New games may change how Casino games introduce a winning round.

Some embodiments of the systems and methods described herein may include a game engine that may present a new family of gameplay. For example, one embodiment may be represented as a wheel instead of rows and columns seen in a typical slot game. While wheels have been utilized for many bonus games and jackpot features, wheels have not been used as the main game presentation of the mathematics. For example, the underlying mathematics (e.g., probability) of a game of chance, not seen by the player, determines the random server outcome. Information on the underlying mathematics (e.g., the odds of winning) may then be shared for visual presentation and result to the player, e.g., after the game or after the bet on the game. The mathematical results may be presented by using a dynamic wheel mechanic presented as described herein, e.g., slices on a wheel. Typical slot games use lines, several symbol combinations, or symbol clusters to define a win or loss. For some of the example systems and methods described herein, no lines, numbers of symbol ways, or clumping is required; instead, only a pointer or some symbol selector is required to establish a paying hit or miss.

While traditional slot games use lines and symbol combinations to create a form of anticipation and dynamic presentation, some examples of the systems and methods described herein may use a dynamic number of wheel slices to create a new effect. For example, a player may not know how many slices will enter the wheel in an embodiment, e.g., before playing a game round. In some example embodiments, the player may not know what symbols will be on those slices and if the slice with the highest value or feature will be selected as a win. Having the player not know how many slices will enter the wheel and/or the player not knowing what symbols will be on those slices before the game, e.g., before the bet, may cause the player high anticipation and excitement. The player's high anticipation and excitement may be from a much simpler game form and in an entirely new, unseen game presentation significantly differentiated from the previous games.

The increased anticipation and excitement may occur with online games and with land-based games, e.g., a free-standing physical gambling machine such as a slot machine or other gaming machine that may be in a "brick and mortar casino." The systems and methods described herein may stand out to a player or players as unique. Some example embodiments may offer a new presentation layer. The presentation layer may be how the game is presented to the players, e.g., a dynamic number of wheel slices. Some example embodiments may offer a new mathematical presentation. For example, the style of an example of gaming according to the systems and methods described herein may use wheel games. The wheel games may lead to or include new mathematical embellishments and designs that the market and players have not seen before.

Some example embodiments may also open the door to entirely new mechanics and games that don't exist on the market and eventually could be coined as a new style of gameplay, such as "Wheel Gaming" or "Video Slot Games," or any other game or games in accordance with the systems and methods described herein. An example embodiment may include wheel gaming and the dynamic entry and presentation of slices or parts of a wheel.

The systems and methods described herein may include a mechanic that may present the game as a wheel, which is round, instead of rows and columns in a typical slot game which may be rectangular. A round wheel game (e.g., not a rectangular game such as a typical slot machine) may mean that a player only sees a minimal number of different possible outcomes. Most modern slot games display a minimum of 12 game symbols but can display up to 50 or more depending upon the game. Displaying so many different possible outcomes results in difficulty for the player to understand if they have won or lost and why they won or lost. As iGaming moves to mobile devices, such a large number of possible outcomes becomes hard to represent for players. Accordingly, these games may be difficult to decipher on larger screens and may be even more complicated for the user on small screens. The systems and methods described herein may simplify these issues by maintaining a smaller number of symbols that are easier to follow and represent wins, even in very small formats. Accordingly, in some embodiments, a wheel game may mean that players only see a minimal number of symbols, e.g., typically 2 to 12, versus rows and rows of long symbol strips that may range up in the hundreds. The symbol strips may represent many symbol combinations, and when games present too many rows, too many columns, or too many combinations, the games may become hard to follow. For example, the game may become hard to follow when, for example, 10-15 rows or a large combination, e.g., hundreds, thousands, tens of thousands, hundreds of thousands, millions, or more combinations are used.

In an example embodiment, the systems and methods described herein may present all the possible winning combinations on the displayed wheel. In an example embodiment, slices may be set up such that only a pointer connecting to a specific symbol at the end of a spin may create a pay opportunity. The use of slices and pointers in some embodiments may be more straightforward for the player to follow and understand. For example, in an embodiment, the player may only need to see the symbols on the wheel and follow which symbol lands on any pointer. In an example embodiment, a counter may be displayed in conjunction with the systems and methods described herein. Example games may display the number of slices added on each spin, so the player may always be informed of the number of slices added to the wheel. In an example embodiment, the number of slices added on each spin may not be indicated until after a bet is made to increase anticipation.

In an example of the systems and methods described herein, an entirely new way of presenting games may be used. Some examples may be a new category of online or land-based games. For example, while wheel games may exist today as game features or jackpot spins, wheel games are not used as the main mechanic, e.g., the visual representation of the wager, nor are they used in the dynamic way described herein. Using a wheel game creates many new game design scenarios where the wheel may be used instead of rows and columns, opening up entirely new ideas, game presentations, and experiences for players. For example, an embodiment may include a game format that uses the wheel as the main game, typically called the base game. The game may also include a dynamic aspect of the wheel, as described herein.

In an example embodiment, a wheel may be dynamically populated. Furthermore, in an aspect, a wheel may have a different presentation for each game.

An alternative approach is to present the visual art result of the mathematical outcome in the game in a different manner to appear different to the player.

Some symbols and some slices may be used with a specific game format. In an aspect, the presentation layer may be unique and different, and hence the game may have a different name.

The math and presentation may be used in almost any game format. The game formats may include games for a lottery, social games, board games that utilize a digital interface, digitally presented land-based Casino games, online or land-based Table Games. Land-based Casino hardware representations, bonusing and gamification features, jackpot awards, or any other game, particularly games utilizing a digital wheel's digital interface presented in a randomly generated dynamic result, may be used.

The systems and methods described herein may include a wheel in the format described herein, having the dynamic addition of wheel parts which is different on each spin and may be anywhere between 2 to x parts. In other words, anywhere between 2 and any large number of parts. The traditional static wheel, where a digital or physical spin rotates a wheel or spinner to land on any specific outcome, also includes a fixed slice count. Additionally, everything is visible to the player on every spin.

Some example embodiments may use various hardware. In an example aspect, the hardware may take the form of any interface-enabled system. For example, the processor or circuitry-based systems described herein may be used to implement the gaming systems described herein. The device in use may range in complexity, e.g., from a single processor-based system to a multiprocessor-based system. Other embodiments may use one or more dedicated circuits, e.g., logic chips.

Some example embodiments may include a desktop personal computer (PC). A desktop PC or a desktop system that one or more people may use may be used with the systems and methods described herein. Such systems may be used in an internet café or a home environment where the device would be generally considered "non-portable." Examples would include any desktop PC by any computer manufacturer.

Some example embodiments may include a laptop computer. The laptop may be like a desktop and produce a similar experience but may be moved more easily between locations. The laptop may have a variety of inputs, from a specific attached, or in-built keyboard, to a touchscreen input allowing the user to use the device more like a tablet.

Some example embodiments may include a betting terminal. The betting terminal may be available to users in a fixed position, e.g., at a casino or other location. Some examples may not fulfill the above qualifications and may be accessed only through a touchscreen in some embodiments. Although the internal hardware may be like a desktop PC, e.g., a processor, memory, long-term storage, software, etc., the interaction for the user in some examples may be through a restricted access system, such as a restricted keyboard or a touchscreen. The user may not have complete control of the betting terminal and may be limited to applications allowed by a host of the betting terminal.

Some example embodiments may include a tablet device. A tablet device may be considered any touchscreen device that does not fulfill the qualifications of a laptop or desktop but still is not a mobile device, as it does not have mobile network communications. Examples here might be a WIFI-only tablet or a WIFI-only pad device. Such a device may rely upon a WIFI network to access a gambling system or other connectivity to a host system.

Some example embodiments may include a mobile device. The mobile device may be a device with mobile network connectivity, e.g., a mobile network device. The mobile device may operate as a tablet device, insomuch as the mobile device may typically use a touchscreen input. Still, the mobile device is not always limited to the touch screen input. Some devices may have a keyboard input as well. Additionally, this device may have independent access to a data network, e.g., when a sufficient network signal is available.

Some example embodiments may include the use of Virtual Reality (VR) or Augmented Reality (AR). As technology allows, it may be possible for users to interact with the systems via either VR or AR. In an example embodiment, via a direct viewer showing the system in question, or another embodiment, by showing the system superimposed over a view that may already be available to the user.

FIG. 1 is a diagram illustrating an example screen in accordance with the systems and methods described herein. The example game illustrated in FIG. 1 may include a Max multiplier of 35,000, a Return to Player (RTP) of 95.5%, 94.3%, or 90.3%, a minimum bet of 0.10, and a maximum bet of 10.00. The example of FIG. 1 includes a rock music theme. The game features MagSpins™, guaranteed win re-spin, free games, and a multiplier wheel.

Figure 2:
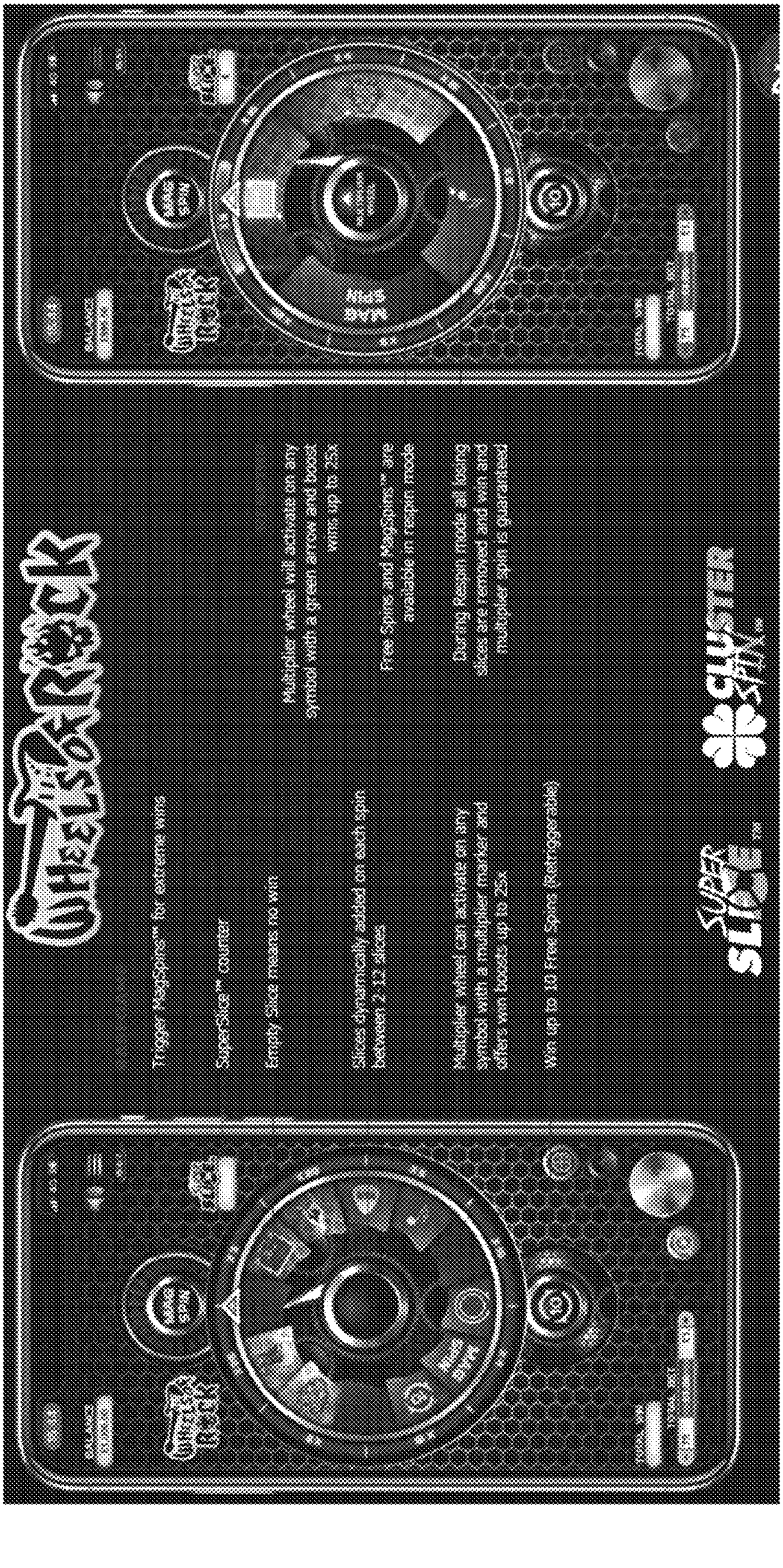
FIG. 2 is a diagram illustrating another example screen in accordance with the systems and methods described herein.

FIG. 2 is a diagram illustrating another example screen in accordance with the systems and methods described herein. As illustrated, the game may be played on a mobile telephone handset. A button may be used to trigger the spins. The "MagSpins™" may be used for higher than usual wins, e.g., wins of higher monetary value, referred to in the figure as "extreme wins."

The game may include a counter. An empty slice may mean no win has occurred. In the example embodiment, slices may be dynamically added on each spin. The number of slices added may vary. For example, in the illustrated embodiment, 2 to 12 slices may be added with each spin. In the example embodiment, a multiplier wheel may activate on any symbol with a multiplier marker and offer win boosts up to 25 times. Other multipliers may be used in other examples. An example button may provide a win of up to, for example, ten free spins. However, it will be understood that any number of free spins may be possible in other embodiments. The free spins button may be re-triggerable. In the illustrated example, re-spins may use a multiplier wheel that will activate on any symbol with a green arrow and boost winds up to 25 times. Free spins and mag spins may be available in re-spin mode. All losing slices may be removed during a re-spin mode and win and multiplier spins may be guaranteed.

Figure 3:
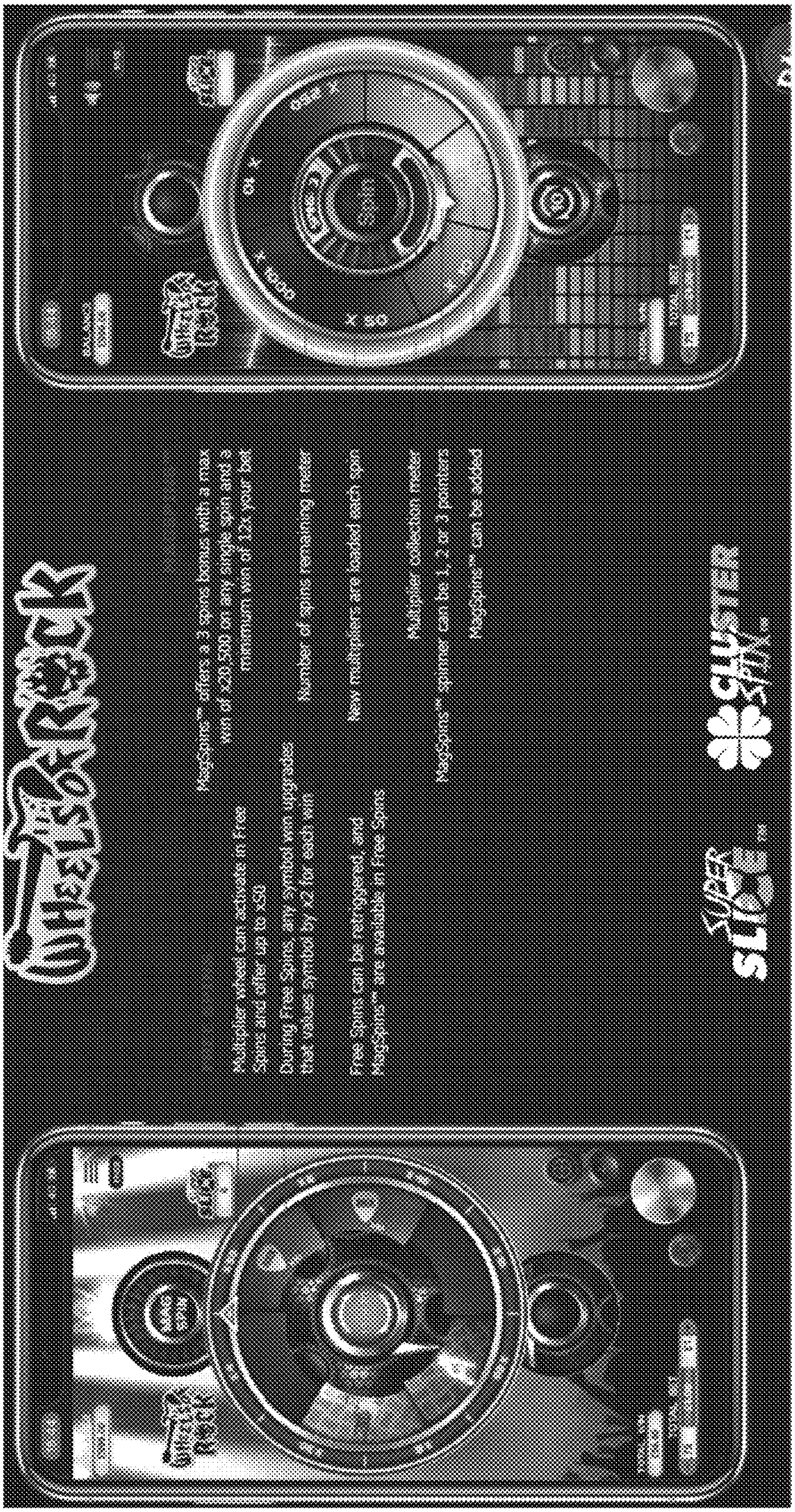
FIG. 3 is a diagram illustrating another example screen in accordance with the systems and methods described herein.

FIG. 3 is a diagram illustrating another example screen in accordance with the systems and methods described herein. In the illustrated example of FIG. 3 a multiplier wheel may activate in free spins and offer up to 50 more spins. Other examples may provide 1-100 or more free spins. During free spins, any symbol win may upgrade that value symbol by two times for each win.

In some cases, a three-spin bonus with a Max win of 20,500× on any single spin and a minimum win of 12 times your bet may be provided. The game may include a number of spins remaining meter. New multipliers may be loaded with each spin. A multiplier collection meter may be included. A spinner can include 1, 2, or 2 pointers in some examples. "MagSpins™" may be added.

Figure 4:
FIG. 4 is a diagram illustrating another example screen in accordance with the systems and methods described herein.

FIG. 4 is a diagram illustrating another example screen in accordance with the systems and methods described herein. The figure illustrates the Wheels of Rock game in landscape view. The example of the Wheels of Rock game includes a number of specific aspects. However, it will be understood that the number of free spins, various multipliers, various bonuses, and other aspects may all vary from game to game.

Figure 5:
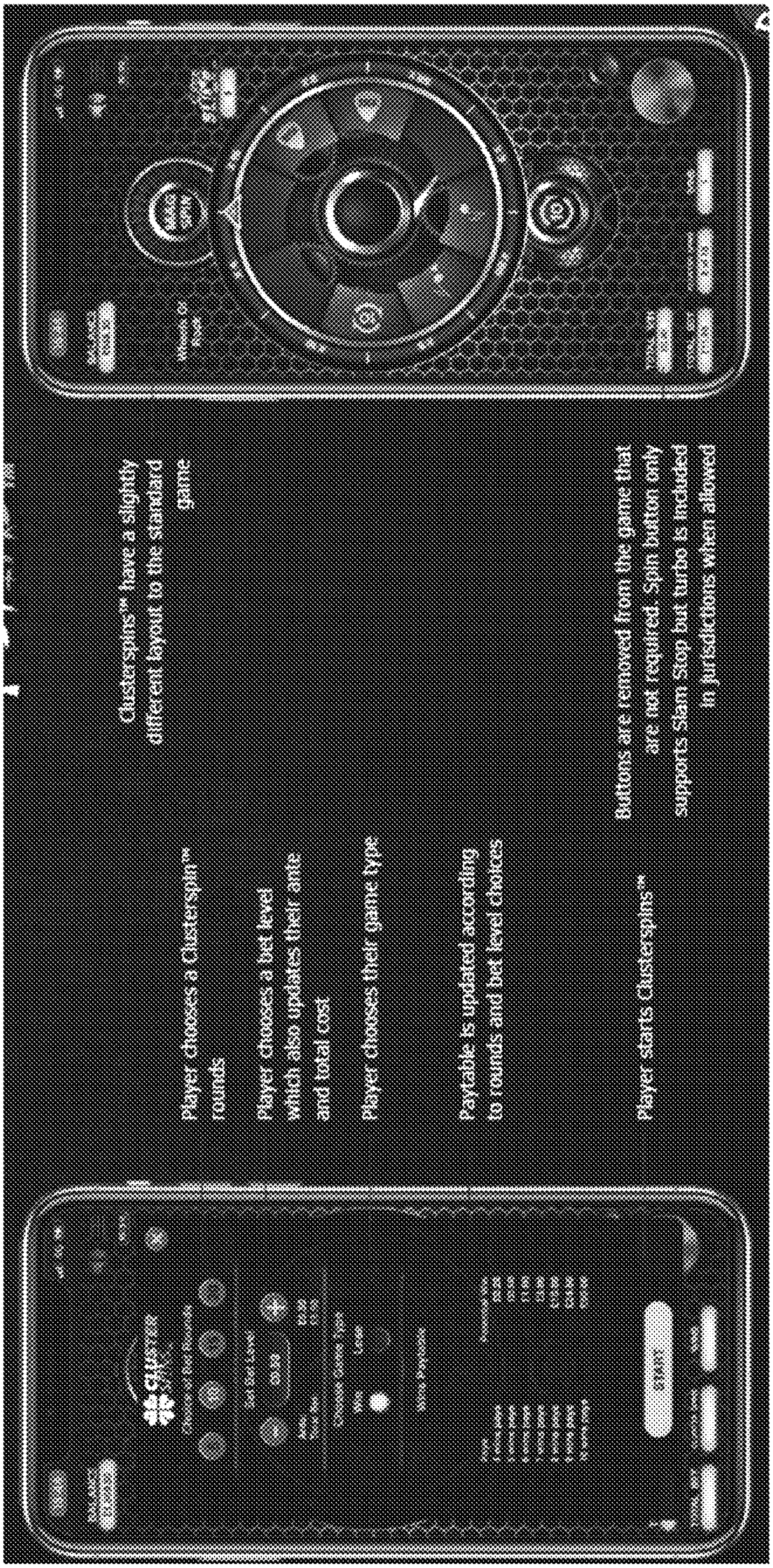
FIG. 5 is a diagram illustrating another example screen in accordance with the systems and methods described herein.

FIG. 5 is a diagram illustrating another example screen in accordance with the systems and methods described herein. The figure illustrates an example of a cluster spin game. In the cluster spin game, a player can choose a number of rounds. The player can choose a bet level that also updates their anti and total cost. The player may also choose their game type. A pay-table may be updated according to rounds and bet level choices. After the selections are made, a player may start the game by hitting start. The layout may vary. In the illustrated example, buttons for this game might not be removed from the game. The spin button might only support "slam stop," but "turbo" may be included in jurisdictions where allowed. "Slam stop" may refer to ceasing a wager at the user's discretion instead of allowing the wager's default period to elapse by itself. For example, a normal wager timeline to present a result may be three seconds, although other time limits are possible. By selecting slam stop, a result may be demanded (e.g., at the player's discretion) in a timeframe that is less than the normal wager timeline, e.g., after one second with a normal wager timeline greater than that one second, e.g., three seconds. "Turbo" may also allow a player to play faster than normal by speeding up the play timing.

Figure 6:
FIG. 6 is a diagram illustrating another example screen in accordance with the systems and methods described herein.

FIG. 6 is a diagram illustrating another example screen in accordance with the systems and methods described herein. The illustrated example of "Journey to Chaos" may include a maximum multiplier of 15,000×, an RTP of 95%, 94.5%, or 90.5%, a minimum bet of 0.10, and a maximum bet that may be determined. The game may have an Egyptian gods theme and feature increasing multipliers, multiplier collection bonuses, and a "Bonus Rush™." Bonus Rush™ may be a feature that allows a player to trigger the game's bonus round directly for a communicated cost. In this way, the player does not have to spin the "base game" hoping for a feature trigger but may jump directly to the features, e.g., for an added cost. This feature may be a common feature in iGaming, although the feature may be listed under other names such as "Bonus Buy," "Premium Play," etc.

An example embodiment may include a split of a simulated gaming wheel, e.g., a "SuperSlice®Split." In an aspect, a split of a simulated gaming wheel may include an ability to split any symbol or collection of values in the game by some value between 2 and "x." For example, an aspect of an example game of chance may include a simulated gaming wheel and a random slice of the wheel (e.g., the angular size of a portion ("slice") of the simulated gaming wheel) that may be selected when a particular outcome occurs. When that selection contains a split marker, then the symbol value may be randomly split between the value of 2 and x. The split may be displayed visually for the player, awarding the player the symbols value, times the number of splits.

An example embodiment may include an added game layer, e.g., SuperSlice®Zones. An added game layer may provide for a layer above the game which, ahead of the conclusion of a spin, may randomly spread a 2-12 multiplier (or any other multiplier) or feature zones around the gaming wheel, e.g., SuperSlice® wheel. The added gaming zones may attach themselves to a symbol or object on the gaming wheel.

An example embodiment may include dual or multiple gaming wheels, e.g., SuperSlice®Dual Wheels. Dual or multiple gaming wheels may present dual SuperSlice® wheels. In an example game, dual or multiple gaming wheels may be used to place multiple gaming wheels, one on top of the other, spinning in the same or opposite directions to award symbols and features on different levels based on gaps in the top wheel, giving access to the bottom spinning wheel, in order to increase anticipation in the game.

An example embodiment may include combining wins, e.g., SuperSlice®Rings. Combining wins may be used for creating combined wins based on multiple SuperSlice® Wheels working together.

Figure 7:
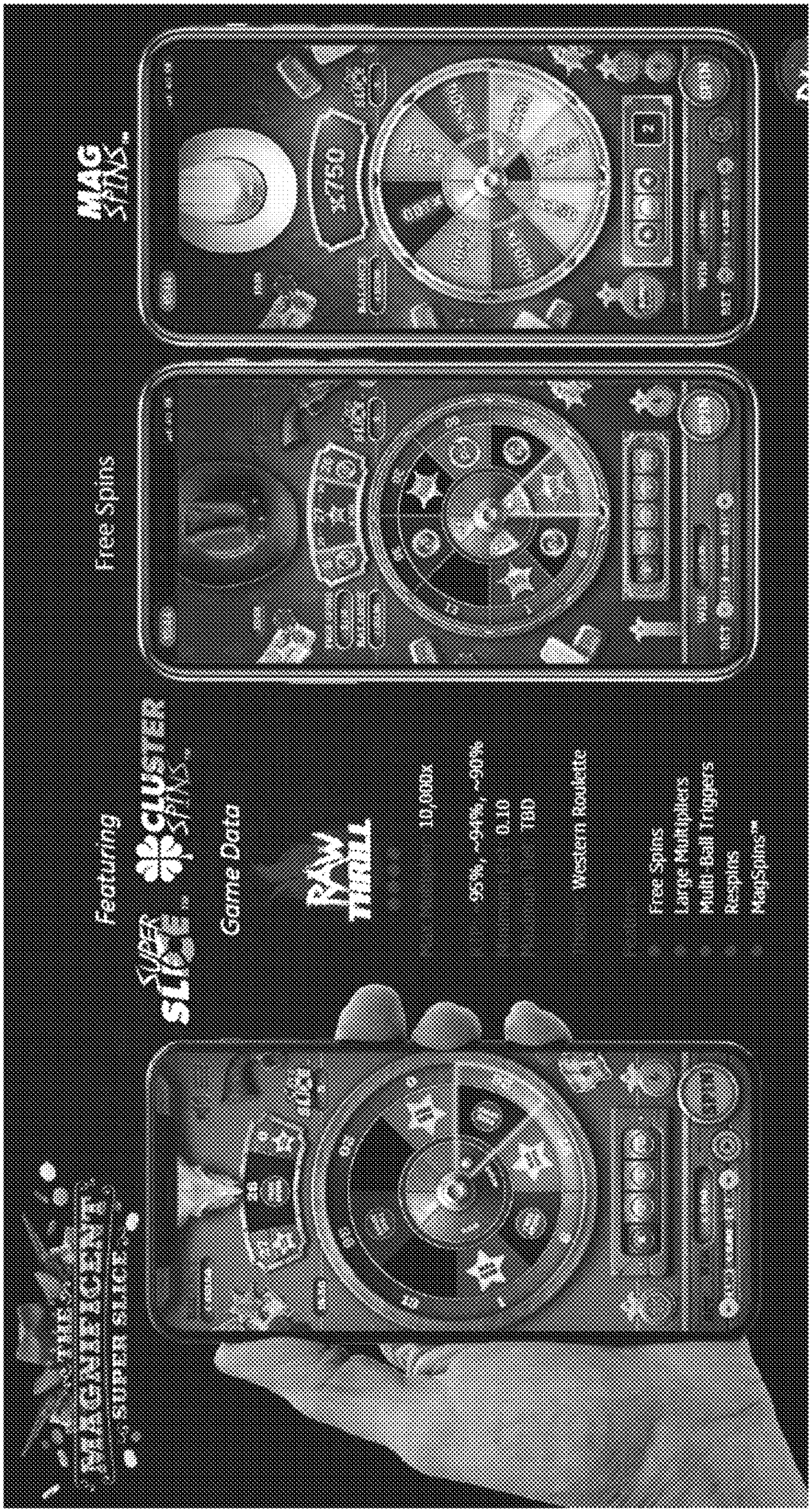
FIG. 7 is a diagram illustrating another example screen in accordance with the systems and methods described herein.

FIG. 7 is a diagram illustrating another example screen in accordance with the systems and methods described herein. The magnificent super slice game may include a maximum multiplier of 10,000 times, and RTP of approximately 95%, approximately 94%, or approximately 90%. The minimum bet may be 0.10, and the maximum bet may be determined. The game may have a western roulette theme. The illustrated example may feature free spins, large multipliers, multi-dash ball triggers, re-spins, and MagSpins™. In an example embodiment, MagSpins™ may be a game feature that awards a minimum of 12× your bet but can pay up to 10,000× your bet when a player has exceptionally high "luck." However, the player knows at a minimum that they will earn 12× when triggering this feature. While specific examples are given above, it will be understood that the payback may vary between Ox and some selected high payback, e.g., 1000×, 10,000×, 100,000×, or higher, or anything from Ox and higher. It will also be understood that the odds for any particular payback may vary.

Figure 8:
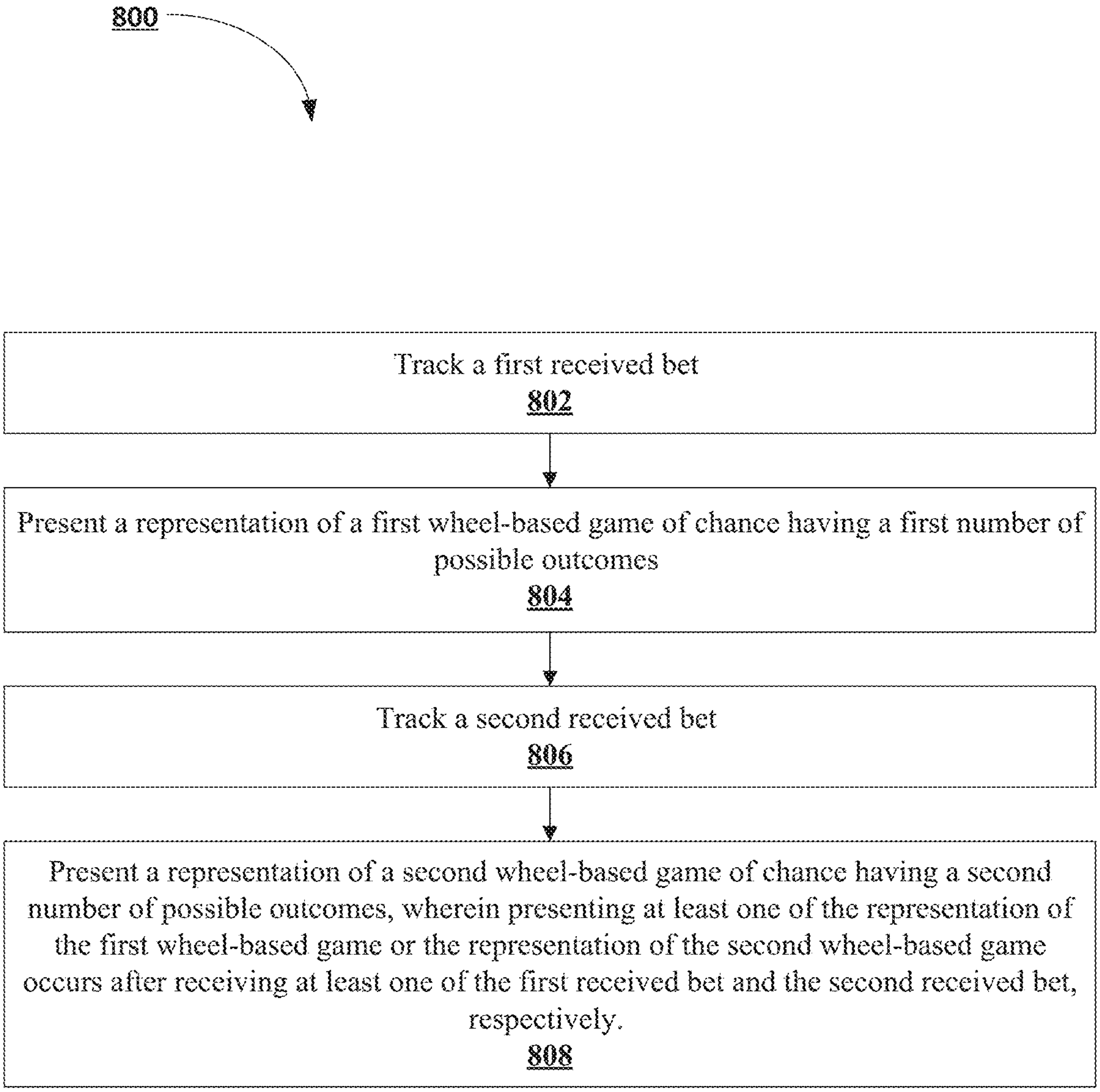
FIG. 8 is a flow diagram illustrating an example method in accordance with the systems and methods described herein.

FIG. 8 is a flow diagram illustrating an example method 800 in accordance with the systems and methods described herein. The example method 800 may be a method 800 of a gaming system. The method 800 may include tracking a first received bet (802), presenting a representation of a first wheel-based game of chance having a first number of possible outcomes (804), tracking a second received bet (806), and presenting a representation of a second wheel-based game of chance having a second number of possible outcomes (808). Presenting at least one of the representation of the first wheel-based game or the representation of the second wheel-based game occurs after receiving at least one of the first received bet and the second received bet, respectively.

In an aspect, the first number of possible outcomes and the second number of possible outcomes are not equal.

In an aspect, the first number of possible outcomes and the second number of possible outcomes each includes several slices on a wheel of a wheel-based game.

In an aspect, each slice of the number of slices includes a symbol.

In an aspect, the gaming system does not present a symbol to a player until after a bet is placed.

In an aspect, a symbol from the first wheel-based game of chance is different from a symbol from the second wheel-based game of chance.

Some examples embodiments may include software. The software in use for the front end may include any system that may be used to show the result of the system. Some examples include, but are not limited to, web content, a native application, or a native desktop application. A web client may include any client written for use in a web environment, e.g., accessed through a web browser. The content delivery to the user may include systems such as Canvas and WebGL as part of DHTML, built using an interpreted language, such as Javascript. In another embodiment, delivery systems may include systems such as Unity that may result in the same effect. In other words, the user may be provided with the same or similar information and/or may need to provide the same or similar inputs. In an example using a native application, the application may be built for a Table, Mobile, or AR/VR device in a language using technology like Xamarin that may be delivered into the application store for use by players. An example using a native desktop application may include any application built in a native language, including languages such as Java or C++ that may run locally on a desktop or laptop system and allow users to interact using their local hardware.

One or more of the components, steps, features, and/or functions illustrated in the figures may be rearranged and/or combined into a single component, block, feature, or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the methods used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible considering the above teaching. It is intended that the scope of the present invention be limited not by this detailed description but rather by the claims of this application. As will be understood by those familiar with the art, the present invention may be embodied in other specific forms without departing from the spirit or essential characteristics thereof. Likewise, the particular naming and division of the modules, routines, features, attributes, methodologies, and other aspects are not mandatory or significant, and the mechanisms that implement the present invention or its features may have different names, divisions, and/or formats.

Furthermore, as will be apparent to one of ordinary skill in the relevant art, the modules, routines, features, attributes, methodologies, and other aspects of the present invention can be implemented as software, hardware, firmware, or any combination of the three. Also, wherever a component, an example of which is a module, of the present invention is implemented as software, the component can be implemented as a stand-alone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A gaming system comprising:

at least one processor and a memory coupled to the at least one processor, the at least one processor configured to:

track a first received bet;

present a representation of a first wheel-based game of chance having a first number of possible outcomes;

dynamically allocate memory resources based on the type and timing of received bets;

prioritize the processing and presentation of game outcomes according to the respective bet types associated with each wheel-based game;

track a second received bet; and present a representation of a second wheel-based game of chance having a second number of possible outcomes, wherein presenting at least one of the representation of the first wheel-based game or the representation of the second wheel-based game occurs after receiving at least one of the first received bet and the second received bet, respectively.

2. The gaming system of claim 1, wherein the first number of possible outcomes and the second number of possible outcomes are not equal.

3. The gaming system of claim 1, wherein the first number of possible outcomes and the second number of possible outcomes each comprise a number of slices on a wheel of a wheel-based game.

4. The gaming system of claim 3, wherein each slice of the number of slices includes a symbol.

5. The gaming system of claim 4, wherein the gaming system does not present a symbol to a player until after a bet is placed.

6. The gaming system of claim 4, wherein a symbol from the first wheel-based game of chance is different from a symbol from the second wheel-based game of chance.

7. A method of a gaming system, the method comprising:

tracking a first received bet;

presenting a representation of a first wheel-based game of chance having a first number of possible outcomes;

dynamically allocating memory resources based on the type and timing of received bets;

prioritizing the processing and presentation of game outcomes according to the respective bet types associated with each wheel-based game;

tracking a second received bet; and presenting a representation of a second wheel-based game of chance having a second number of possible outcomes, wherein presenting at least one of the representation of the first wheel-based game or the representation of the second wheel-based game occurs after receiving at least one of the first received bet and the second received bet, respectively.

8. The method of claim 7, wherein the first number of possible outcomes and the second number of possible outcomes are not equal.

9. The method of claim 7, wherein the first number of possible outcomes and the second number of possible outcomes each comprise a number of slices on a wheel of a wheel-based game.

10. The method of claim 9, wherein each slice of the number of slices includes a symbol.

11. The method of claim 10, wherein the gaming system does not present a symbol to a player until after a bet is placed.

12. The method of claim 10, wherein a symbol from the first wheel-based game of chance is different from a symbol from the second wheel-based game of chance.

13. A computer-readable medium storing instructions configured to direct a computing device to perform a method, the method comprising:

tracking a first received bet;

presenting a representation of a first wheel-based game of chance having a first number of possible outcomes;

dynamically allocating memory resources based on the type and timing of received bets;

prioritizing the processing and presentation of game outcomes according to the respective bet types associated with each wheel-based game;

tracking a second received bet; and presenting a representation of a second wheel-based game of chance having a second number of possible outcomes, wherein presenting at least one of the representation of the first wheel-based game or the representation of the second wheel-based game occurs after receiving at least one of the first received bet and the second received bet, respectively.

* * * * *